(12) United States Patent
Keller

(10) Patent No.: US 6,536,561 B1
(45) Date of Patent: Mar. 25, 2003

(54) ELECTROMAGNETIC WHEEL BRAKE DEVICE

(75) Inventor: Frieder Keller, Ubstadt-Weiher (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,152

(22) PCT Filed: Jul. 15, 1999

(86) PCT No.: PCT/DE99/02199

§ 371 (c)(1),
(2), (4) Date: Sep. 21, 2001

(87) PCT Pub. No.: WO00/28234

PCT Pub. Date: May 18, 2000

(30) Foreign Application Priority Data

Nov. 10, 1998 (DE) .......................... 198 51 670

(51) Int. Cl.[7] .......................... F16D 55/02; F16D 65/16
(52) U.S. Cl. ....................... 188/71.8; 188/162
(58) Field of Search ............... 188/71.8, 71.1, 188/72.1, 72.8, 71.7, 156, 158, 160, 162; 475/154, 282, 296, 314, 320

(56) References Cited

U.S. PATENT DOCUMENTS 5,879,264 A * 3/1999 Raghavan et al. .......... 475/271
6,012,556 A * 1/2000 Blosch et al. ............... 188/158
6,213,909 B1 * 4/2001 Raghavan .................... 475/282
6,270,441 B1 * 8/2001 Park ........................... 475/282

* cited by examiner

*Primary Examiner*—Douglas C. Butler
*Assistant Examiner*—C. T. Bartz
(74) *Attorney, Agent, or Firm*—Ronald E. Greigg

(57) ABSTRACT

An electromechanical wheel brake device for a motor vehicle, having an electric motor for driving two planetary gears, connected in series with one another, which actuate the wheel brake device via a threaded roller gear. The planetary gear is provided with a first electromagnetic coupling, with which a sun wheel of the second planetary gear can be locked, or can be connected in a manner fixed against relative rotation to a sun wheel of the first planetary gear, and with a second electromagnetic coupling, with which a ring gear of the second planetary gear can be stopped or can be connected in a manner fixed against relative rotation to a ring gear of the first planetary gear. By means of the electric motor, by switching of the two couplings, the rolling thread drive can be driven fast to overcome an air gap, slowly and with major speed reduction for the ensuing exertion of a high braking force, and fast for releasing without a reversal of the direction of rotation of the electric motor. For use as a parking brake, both couplings are switched to be without current, as a result of which the second planetary gear is blocked and an imposed braking force is maintained while the electric motor is stopped.

6 Claims, 1 Drawing Sheet

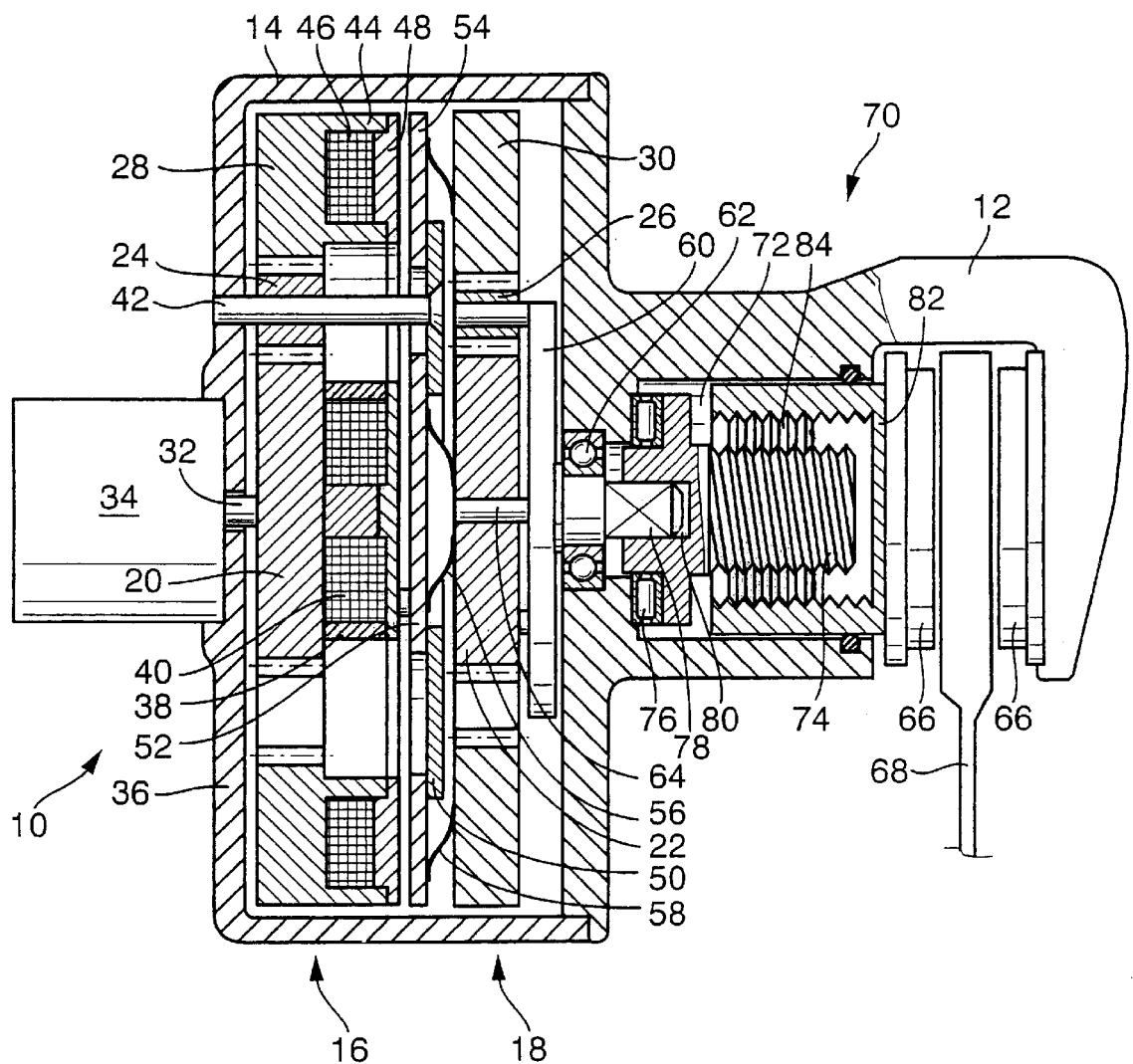

ELECTROMAGNETIC WHEEL BRAKE DEVICE

CROSS-REFERENCE TO RELATED APPLICATIONS

This application is a 35 USC 371 application of PCT/DE 99/02199 filed on Jul. 15, 1999.

BACKGROUND OF THE INVENTION

1. Field of the Invention

The invention relates to an electromechanical wheel brake device which is intended in particular for use in a motor vehicle.

2. Description of the Prior Art

One electromechanical wheel brake device is known from German Patent Disclosure DE 38 40 685 A1. This known wheel brake device has an electric motor and three series-connected planetary gears, the first of which can be driven by the electric motor. The third planetary gear actuates a brake actuating device of the wheel brake device, and the brake actuating device of the known wheel brake device has a double cam that is rotatable with the third planetary gear and that presses two brake jaws (friction brake linings) against a brake drum (brake body) of the wheel brake device, embodied as a drum brake. One of the planetary gears, preferably the first one, has two switchable couplings, with which, selectively, a ring gear of the planetary gear can be locked or a ring gear of the planetary gear can be connected to the ring gear in a manner fixed against relative rotation. In the case of the ring gear rotationally fixed to the ring gear, one planetary gear is bridged; its gear ratio is 1:1. In this state, only the two outer planetary gears effect a speed reduction, and as a result the brake actuating device is actuable fast, but with low moment or low force. In this state, an air gap between the friction brake linings and the brake body is overcome. After reversing the two couplings, the planetary gear equipped with the couplings executes a speed reduction as well; the overall result is a greater speed reduction over all three planetary gears. In this state, the brake actuating device is indeed actuated more slowly, but with greater force or greater moment. This situation serves to press the friction brake linings, already contacting the brake body, against the brake body with great force and as a result to attain a high brake force and a high braking moment.

SUMMARY OF THE INVENTION

The wheel brake device of the invention has two planetary gears and two switchable couplings. One of the two switchable couplings, in one switching position, stops a sun wheel of the second planetary gear, and in another switching position, it connects the sun wheels of the two planetary gears to one another in a manner fixed against relative rotation. The second coupling, in one switching position, stops a ring gear of the second planetary gear, while in another switching position it connects the ring gears of the two planetary gears to one another in a manner fixed against relative rotation. The wheel brake device of the invention makes four switching states of its two planetary gears possible, namely a fast gear and a slow gear for tightening the wheel brake device, a fast gear with a reversal of the direction of rotation for releasing the wheel brake device, and a locked position, in which the two planetary gears cannot retate, so that a braking force exerted is also maintained while the electric motor is without current.

The wheel brake device of the invention has the advantage that an air gap between the friction brake lining and the brake body is rapidly overcome with it, and then, by a transition to a higher gear ratio, a high contact pressure of the friction brake lning against the brake body can be attained. Another advantage is that with the same direction of rotation of the electric motor, the contact pressure of the friction brake lining against the brake body can be reduced, and the wheel brake device can be released entirely; accordingly, upon release of the wheel brake device the electric motor is operated in the same direction of rotation as in tightening of the brakes. Hence no reversal of the direction of rotation and no reversing mode of the electric motor are necessary. When operating the wheel brake device, the electric motor is merely turned on and off, and a pwer switches suffices for this purpose. Conversely, to reverse the direction of rotation and no reversing mode of the electric motor are necessary. When operating the wheel brake device, the electric motor is merely turned on and off, and a power switch suffices for this purpose. Conversely, to reverse the direction of rotation would require a full bridge with four power switches. Another advantage of the invention is that the restoration of the wheel brake device takes place at high speed, so that the wheel brake device takes place at high speed, so that the wheel brake device is released rapidly. In addition, the wheel brake device of the invention has the advantage of improved dynamics, since in a rapid alternation of tightening and releasing, or from increasing the contact pressure of the friction brake lining against the brake body to reducing the contact pressure and vice versa, the direction of rotation of the electric motor is not reversed counter to its moment of inertia, but rather is maintained unchanged, so that in a rapid alternation, the moment of inertia of the electric motor can even be utilized. This makes the wheel brake device of the invention especially well suited to anti-lock, traction control and/or electronic stability control, which necessitate a rapid alternation between tightening and release, or between increasing and reducing the braking force.

Preferably, the two switchable couplings are embodied as electromagnetic couplings, which in a basic position without current, stop the sun wheel and the ring gear of the second planetary gear. In this way, the wheel brake device is stopped, so that an imposed contact pressure of the friction brake lining against the brake body is maintained, even when the electric motor has no current. As a result, the wheel brake device can be used as a parking brake.

For converting the rotary motion of the second planetary gear into a translational motion for pressing the friction brake lining against the brake body, in one feature of the invention the actuating device of the wheel brake device has a screw thread, which is preferably embodied as a threaded roller gear for the sake of improved efficiency and low friction.

BRIEF DESCRIPTION OF THE DRAWINGS

The invention will be described in further detail below, with reference to the drawing in which the sole drawing FIGURE shows an exemplary embodiment of a wheel brake device of the invention in section, in a partly simplified, schematic illustration.

DESCRIPTION OF THE PREFERRED EMBODIMENT

The electromechanical wheel brake device of the invention, identified overall by reference numeral 10, is embodied as a disk brake having a brake caliper 12, to which a gearbox 14 is flanged. Two series-connected planetary gears 16, 18 are received in the gearbox 14. Each planetary gear 16, 18 has one sun wheel 20, 22, three planet wheels 24, 26, and one ring gear 28, 30. Only one of the planet wheels 24, 26 can be seen, since the other two planet wheels are located in front of and behind the plane of the drawing, and the planet wheel located behind the plane of the drawing is concealed by the respective sun wheel 20, 22.

The sun wheel 20 of the first planetary gear is seated in a manner fixed against relative rotation on a motor shaft 32 of an electric motor 34, which is flanged from outside to an end wall 36 of the gearbox 14. A cylindrical pole body 38 of a first, switchable electromagnetic coupling is mounted in a manner fixed against relative rotation on a face end, which is remote from the electric motor 34 and oriented toward the second planetary gear 18, of the sun wheel 20 of the first planetary gear 16.

The planet wheels 24 of the first planetary gear 16 are supported rotatably on axle pins 42, which are anchored firmly in the end wall 36 of the gearbox 14. The planet wheels 24 of the planetary gear 16 are thus received in stationary fashion, but rotatable about their own axes, in the gearbox 14, while the end wall 36 of the gearbox 14 forms a stationary planet carrier of the first planetary gear 16.

The ring gear 28 of the first planetary gear 16 has a laterally disposed, hollow annular collar 44, in which a coil 46 is received. The annular collar 44 is located on a side of the ring gear 28 oriented toward the second planetary gear 18. It forms a pole body 44 of a second, switchable electromagnetic coupling and is closed, on the side toward the second planetary gear 18, by a friction lining 48 that is a component part of the second coupling.

An annular, disk-like brake ring 50 is riveted to the axle pins 42 of the planet wheels 24 of the first planetary gear 16. The brake ring 50 is located in an interstice between the first and second planetary gears 16, 18. Since the axle pins 42 are firmly anchored in the gearbox 14, the brake ring 50, riveted to the axle pins 42, is also retained in stationary fashion in the gearbox housing 14.

The brake ring 50 cooperates with armature plates 52, 54 of the two electromagnetic couplings 38, 40, 52; 44, 46, 48, 54. The armature plates 52, 54 are disposed in the same plane, in an interstice between the brake ring 50 and the first planetary gear 16. The armature plate 52 of the first electromagnetic coupling 38, 40, 52 has the shape of a circular disk and is encircled by the armature plate 54, having the form of an annular disk, of the second electromagnetic coupling 44, 46, 48, 54.

The armature plate 52 of the first electromagnetic coupling 38, 40, 52 is riveted to an outer rim of a cup spring 56, whose inner rim is riveted to the sun wheel 22 of the second planetary gear 18. Via the cup spring 56, the armature 52 of the first electromagnetic coupling 38, 40, 52 is connected in a manner fixed against relative rotation to the sun wheel 22 of the second planetary gear 18. The cup spring 56 attracts the armature plate 52 in the direction of the sun wheel 22; that is, the armature plate 52 rests on the brake ring 50, connected in a manner fixed against relative rotation, in the gearbox 14 because of the spring force of the cup spring 56. In this currentless basic position of the first electromagnetic coupling 38, 40, 52, the sun wheel 22 of the second planetary gear 18 is locked against rotating.

By supplying electric current to the coil 40 of the first electromagnetic coupling 38, 40, 52, the armature place 52 is raised from the brake ring 50 counter to the spring force of the plate spring 56 and is brought into frictional engagement with the pole body 38 of the first electromagnetic coupling 38, 40, 52. In this switching position attained with current of the first electromagnetic coupling 38, 40, 52, the sun wheel 22 of the second planetary gear 18 is connected in a manner fixed against relative rotation, via the cup spring 56, to the sun wheel 20 of the first planetary gear 18.

The armature disk 54 of the second electromagnetic coupling 44, 46, 48, 54 is riveted to an outer edge of an annular cup spring 58, whose inner wall is joined to the ring gear 30 of the second planetary gear 18. As a result, the armature plate 54 of the second electromagnetic coupling 44, 46, 48, 54 into contact with the brake ring 50 fixed in a gearbox 14, so that in the currentless basic poition of the second electromagnetic coupling 44, 46, 48, 54, the ring gear 30 of the second planetary gear 18 is retained non-rotatably in the gearbox 14. By supplying current to the coil 46, the second electromagnetic coupling 44, 46, 48, 54 is switched over to its switching position with current, in which its armature plate 54 is lifted by magnetic force, counter to the spring force of the annular cup spring 58, from the brake ring 50 and presses in frictional engagement against the friction brake lining 48 of the second electromagnetic coupling 44, 46, 48, 54. In this switching position with current of the second electromagnetic coupling, 44, 46, 48, 54, the ring gears 28, 30 of the two planetary gears 16, 18 are connected to one another in a manner fixed against relative rotation.

The planet wheels 26 of the second planetary gear 18 are supported, rotatable about their own axes, on a planet carrier 60, which in turn is supported rotatably on the brake caliper 12 by means of a ball bearing 62. The planet wheels 26 of the second planetary gear 18 can accordingly revolve about the sun wheel 22, in the conventional way for planetary gears, and can also rotate about their own axes.

The sun wheel 22 of the second planetary gear 18 is rotatably supported on a shaft stub 64, which is integral with the planet carrier 60.

For converting a rotary motion of the planet carrier 60 into a translational motion for pressing two friction brake linings 66 against a brake disk 68, the wheel brake device 10 has a brake actuating device 70. The brake actuating device 70 is embodied as a threaded roller gear and is accommodated in a bore 72, which is made perpendicular to the brake disk 68 and coaxial to the planetary gears 16, 18 in the brake caliper 12. The threaded roller gear has a spindle 74, which is braced in the bore 72 of the brake caliper 12 via an axial roller bearing 76. Via a square peg 78, which is integral with the planet carrier 60 of the second planetary gear 18 and which engages a complimentary square hole 80 in the spindle 74, the spindle 74 is connected by positive engagement to the planet carrier 60 in a manner fixed against relative rotation. The spindle 74 is gripped by a nut 82, which is coaxial with the spindle 74 and has a greater thread diameter than the spindle 74, creating an annular interstice between the spindle 74 and the nut 82. A number of threaded rollers 84 are disposed in the interstice, and these rollers mesh with both the thread of the spindle 74 and the thread of the nut 82. The spindle 74, nut 82 and threaded rollers 84 are component parts of the threaded roller gear.

By driving the spindle 74 to rotate, the threaded rollers 84 are driven to a revolving motion, complementary to that of the planet wheels of a planetary gear, around the spindle 74, while at the same time the threaded rollers 84 rotate about their own axes. Because of the slopes of the threads of the spindle 74, nut 82, and threaded rollers 84, the revolving motion of the threaded rollers 84 and the rotation about their own axes causes an axial displacement of the nut 82. The displacement of the nut 82 takes place even whenever the threaded rollers 84, as in the exemplary embodiment shown, have a thread pitch of zero, or in other words are provided with revolving grooves instead of a thread. By means of its displacement, the nut 82 presses the friction brake lining 66, mounted on it, against one side of the brake disk 68. The other friction brake lining 66 is pressed in a manner known per se, by reaction force, against the other side of the brake disk 68 via the brake caliper 12 embodied as a floating caliper.

The function of the wheel brake device 10 of the invention is as follows: For overcoming an air gap between the friction brake linings 66 and the brake disk 68, the first coupling 38, 40, 52 is supplied with current, as a result of which its armature disk 52 is lifted from the fixed brake ring 50 in the gearbox 14 and is brought into frictional engagement with the pole body 38 of the first electromagnetic coupling 38, 40, 52. The sun wheel 22 of the second planetary gear 18 is connected in a manner fixed against relative rotation to the sun wheel 20 of the first planetary gear 16 and thus in a manner fixed against relative rotation to the motor shaft 32. By supplying current to the electric motor 34, the sun wheel 22 of the second planetary gear 18 is driven by the electric motor 34 to rotate directly, and via the planet wheels 26 and the planet carrier 60 of the second planetary gear 18, it drives the spindle 74 of the threaded roller gear 74, 82, 84 to rotate. The ring gear 30 is retained non-rotatably in the gearbox 14 by the second, currentless coupling 44, 46, 48, 54. The nust 82 displaces the friction brake lining 66 mounted on it directly, and displaces the opposite friction brake lining 66 indirectly via the brake caliper 12 into contact against the brake disk 68. When the air gap between the friction brake linings 66 and the brake disk 68 is overcome, the ring gear 28 or the first planetary gear 16 is a freely rotatable, while tahe first planetary gear 16 is out of operation.

As soon as the friction brake linings 66 rest on the brake disk 68, the contact pressure of the friction brake linings 66 against the brake disk 68 that is required to generate a braking force or braking moment, and consequently the requisite driving torque of the threaded spindle 74, rise abruptly. This can easily be ascertained, for instance from an abrupt increase in the current consumption of the electric motor 34 or from the drop in its rpm. To apply the requisite contact pressure for braking when the friction brake linings 66 are contacting the brake disk 68, current is supplied not only to the first coupling 38, 40, 52 but also to the second coupling 44, 46, 48, 54. Thus, in addition to the sun wheels 20, 22, the ring gears 28, 30 of the two planetary gears 16, 18 are also connected to one another in a manner fixed against relative rotation. While the sun wheel 22 of the second planetary gear 18, connected to the motor shaft 32 ina manner fixed against relative rotation, rotates at the same speed as the motor shaft 32, the ring gear 30 of the second planetary gear 18 is driven to a rotary motion in the opposite direction from the sun wheel 22 of the second planetary gear 18, via the sun wheel 20, the planet wheels 24 that are rotatable about the stationary axle pins 42, and the ring gear 28 of the first planetary gear, with which the ring gear 30 of the second planetary gear 18 is connected in a manner fixed against relative rotation via the second coupling 44, 46, 48, 54, which has current. The second planetary gear 18 in this state acts as a differential gear; the rotation of the sun wheel 22 and the ring gear 30 are superimposed on one another, and the speed of revolution of the planet wheels 26 of the second planetary gear 18 is reduced considerably, and thus the torque transmitted by the electric motor 34 to the spindle 74 of the threaded roller gear 74, 82, 84 is increased by a multiple of the original value. Since the sun wheels 20, 22 of the two planetary gears 16, 18 have the same diameter, and the planet wheels 24 of the first planetary gear 16 are larger than the planet wheels 26 of the second planetary gear 18, the planet wheels 26 of the second planetary gear 18 continue to revolve in the same direction as when the air gap between the friction brake linings 66 and the brake disk 68 is overcome.

To reduce the brake force, release the wheel brake device 10, and adjust the air gap between the friction brake linings 66 and the brake disk 68, the first coupling 38, 40, 52 is not supplied with current, while the second coupling 44, 46, 48, 54 is supplied with current; the electric motor 34 is supplied with current, specifically with the same polarity as when the wheel brake device 10 is tightened; that is, in tightening and in releasing the wheel brake device 10, the electric motor 34 has the same direction of rotation. The first coupling 38, 40, 52, which is currentless, keeps the sun wheel 22 of the second planetary gear 18 non-rotatable. The spindle 74 is driven to rotate via the sun wheel 20, the planet wheels 24, and the ring gear 28 of the first planetary gear 16, the ring gear 30 of the second planetary gear 18, which rotates with the ring gear 28 of the first planetary gear 16, and the planet wheels 26 of the second planetary gear 18, which revolve about the stopped sun wheel 22 of the second planetary gear 18. The two planetary gears 16, 18 effect a reversal of the direction of rotation; for the same direction of rotation of the motor shaft 32, the spindle 74 rotates in the opposite direction from before, so that the friction brake linings 66 are lifted from the brake disk 68.

For the sake of maintaining an imposed brake force, the two couplings 38, 40, 52; 44, 46, 48, 54 are not supplied with current; they stop the sun wheel 22 and the ring gear 30 of the second planetary gear 18, as a result of which the second planetary gear 18 is blocked, so that the spindle 74 of the threaded roller gear 74, 82, 84 does not rotate, even when the electric motor 34 is currentless. An imposed brake force is maintained. The brake device 10 of the invention can accordingly be used as a parking brake. A braking force during a braking event can also be kept constant, without having to supply current to the electric motor 34, which has the advantage of saving energy and of producing less heating of the electric motor 34.

The foregoing relates to a preferred exemplary embodiment of the invention, it being understood that other variants and embodiments thereof are possible within the spirit and scope of the invention, the latter being defined by the appended claims.

What is claimed is:

1. An electromechanical wheel brake device for a motor vehicle comprising an electric motor (34) a first planetary gear (16) driven by said electric motor, a second planetary gear (18) which is driven by said first planetary gear, a brake actuating device which is actuated by said second planetary gear and with which a friction brake lining can be pressed against a brake body and raised again, the brake body being rotationally fixed to a vehicle wheel, said first and second planetary gears (16, 18) having different gear ratios, a first switchable coupling (38, 40, 52), which in one switchable position stops a sun wheel (22) of said second planetary gear (18) and in another switchable position connects the sun wheels (20, 22) of said first and second planetary gears (16, 18) to one another in a manner fixed against relative rotation, and a second, switchable coupling (44, 46, 48, 54), which in one switchable position stops a ring gear (30) of the second planetary gear (18) and in another switchable position connects the ring gears (28, 30) of the two planetary gears (16, 18) to one another in a manner fixed against relative motion, wherein a planet carrier (60) of said second planetary gear (18) actuates a brake actuating device (70).

2. The electromechanical wheel brake device of claim 1, wherein said first planetary gear (16) has a higher gear ratio than said second planetary gear (18).

3. The electromechanical wheel brake device of claim 1, wherein the planet carrier end wall (36) of said first planetary gear (16) is stationary.

4. The electromechanical wheel brake device of claim 1, wherein at least one of said first and second switchable couplings (38, 40, 52; 44, 46, 48, 54) is embodied as an electromagnetic coupling.

5. The electromechanical wheel brake device of claim 4, wherein both said switchable couplings (38, 40, 52; 44, 46, 48, 54) are embodied as electromagnetic couplings, and wherein, in a basic position without current, said first switchable coupling (38, 40, 52) stops the sun wheel (22), and said second switchable coupling (44, 46, 48, 54), in a basic position without current, stops the ring gear (30) of said second planetary gear (18).

6. The electromechanical wheel brake device of claim 1, wherein said brake actuating device (70) has a screw thread comprising a threaded roller gear (74, 82, 84).

* * * * *